United States Patent
Tsai et al.

(10) Patent No.: US 12,373,273 B2
(45) Date of Patent: Jul. 29, 2025

(54) REPORTING PCIe DEVICE ERROR INFORMATION

(71) Applicant: Dell Products L.P., Round Rock, TX (US)

(72) Inventors: Tzu-Hsiu Tsai, Zhongshan District (TW); David K. Chalfant, Round Rock, TX (US); Yiping Zhou, Houston, TX (US)

(73) Assignee: Dell Products L.P., Round Rock, TX (US)

( * ) Notice: Subject to any disclaimer, the term of this patent is extended or adjusted under 35 U.S.C. 154(b) by 282 days.

(21) Appl. No.: 17/872,619

(22) Filed: Jul. 25, 2022

(65) Prior Publication Data

US 2024/0028433 A1 Jan. 25, 2024

(51) Int. Cl.
*G06F 11/07* (2006.01)
*G06F 13/42* (2006.01)

(52) U.S. Cl.
CPC ...... *G06F 11/0751* (2013.01); *G06F 11/0745* (2013.01); *G06F 11/0769* (2013.01); *G06F 13/4282* (2013.01); *G06F 2213/0026* (2013.01)

(58) Field of Classification Search
CPC ............ G06F 11/0745; G06F 11/0751; G06F 11/0769; G06F 11/0772; G06F 11/0775
See application file for complete search history.

(56) References Cited

U.S. PATENT DOCUMENTS

| | | | | |
|---|---|---|---|---|
| 8,370,534 | B2 * | 2/2013 | Khatri | G06F 13/32 |
| | | | | 710/13 |
| 10,795,785 | B2 * | 10/2020 | Wang | G06F 11/3027 |
| 11,994,940 | B2 * | 5/2024 | Liu | G06F 11/0772 |
| 2009/0327684 | A1 * | 12/2009 | Zimmer | G06F 21/575 |
| | | | | 713/2 |
| 2013/0124768 | A1 * | 5/2013 | Khatri | G06F 13/24 |
| | | | | 710/261 |
| 2019/0026202 | A1 | 1/2019 | Chalfant et al. | |
| 2020/0089564 | A1 | 3/2020 | Chao et al. | |
| 2020/0285534 | A1 * | 9/2020 | Chaiken | G06F 11/0745 |
| 2020/0301863 | A1 * | 9/2020 | Long | G06F 13/4022 |
| 2021/0279193 | A1 | 9/2021 | Leyendecker et al. | |
| 2021/0349777 | A1 * | 11/2021 | Liu | G06F 11/0745 |
| 2022/0004451 | A1 * | 1/2022 | Chalfant | G06F 9/5016 |
| 2022/0179961 | A1 * | 6/2022 | Yao | G06F 13/4221 |
| 2024/0028433 | A1 * | 1/2024 | Tsai | G06F 11/0751 |
| 2024/0028729 | A1 * | 1/2024 | Liu | G06F 8/654 |

* cited by examiner

*Primary Examiner* — Kamini B Patel
(74) *Attorney, Agent, or Firm* — Larson Newman, LLP

(57) ABSTRACT

An information handling system includes multiple PCIe devices and a basic input/output system (BIOS). The BIOS receive a system management interrupt (SMI). The SMI is in response to a detection of an error on a first PCIe device of the PCIe devices. The BIOS collect data associated with the first PCIe device. The data includes a friendly full device description for the first PCIe device. Based on the friendly full device description, the BIOS determine a friendly name for the PCIe device. The BIOS provide an error message on a display device of the information handling system. The error message includes a type of the error detected and the friendly name for the PCIe device.

20 Claims, 5 Drawing Sheets

REPORTING PCIe DEVICE ERROR INFORMATION

FIELD OF THE DISCLOSURE

This disclosure generally relates to information handling systems, and more particularly relates to reporting PCIe device error information in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes multiple PCIe devices and a basic input/output system (BIOS). The BIOS may receive a system management interrupt (SMI). The BIOS may collect data associated with the first PCIe device. The data includes a peripheral component interconnect express (PCIe) location with segment, bus, device, function. Based on the information, the BIOS may get a friendly name for the PCIe device. The BIOS may provide an error message on a display device of the information handling system. The error message may include a type of the error detected and the friendly name for the PCIe device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
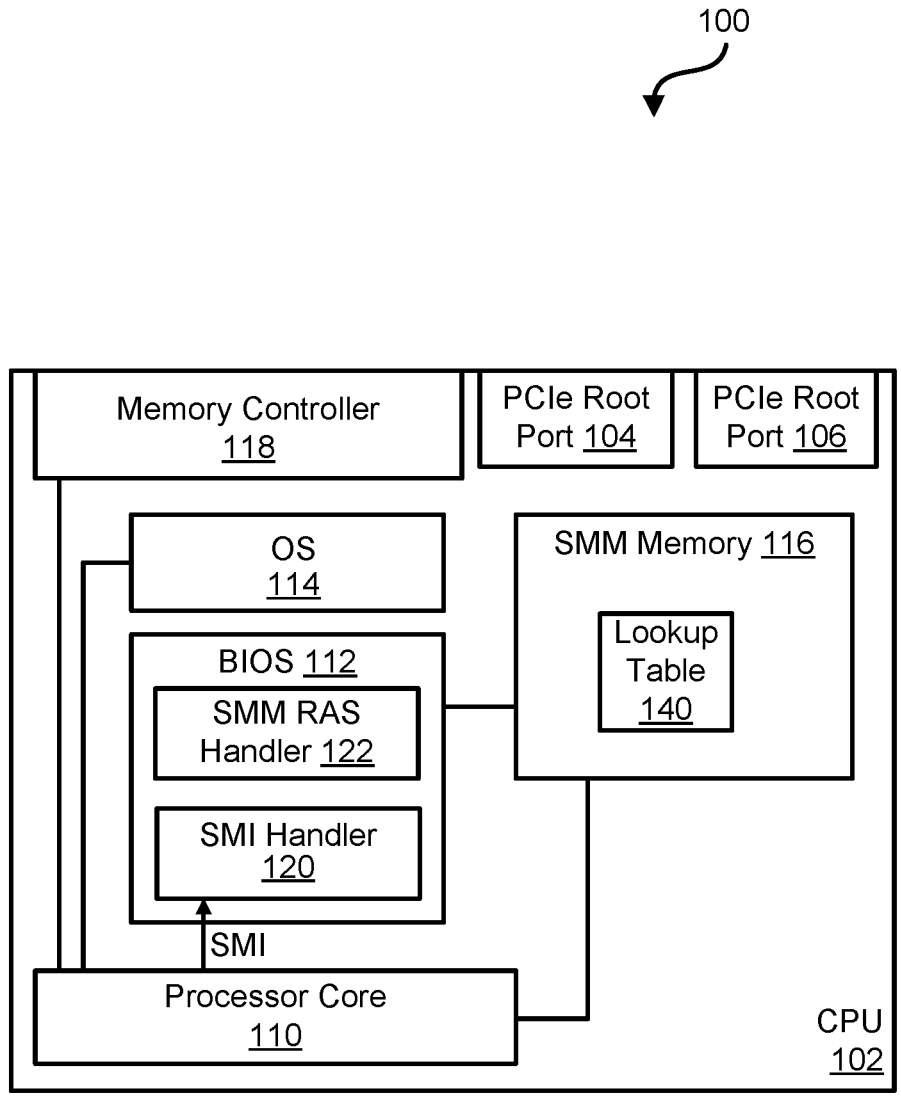
FIG. 1 is block diagram of a portion of an information handling system according to at least one embodiment of the disclosure.

FIG. 1 shows an information handling system 100 including central processing unit (CPU) 102. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 includes CPU 102 6. In an example, the information handling system 100 can be a server, a personal computer, a laptop computer, or the like. PCIe devices may include, but are not limited to, dual in-line memory modules (DIMMs), embedded serial advanced technology attachment (SATA) devices, redundant array of independent disks (RAID) controllers, NICs, PCIe solid-state drives (SSDs), and integrated network interface cards (NICs). CPU 102 includes multiple peripheral component interconnect express (PCIe) root ports 104 and 106, a processor core 110, a basic input/output system (BIOS) 112, an operating system (OS) 114, a system management mode (SMM) memory 116, and a memory controller 118. BIOS 112 includes a system management interrupt (SMI) handler 120 and a SMM reliability, availability, and serviceability (RAS) error handler 122, both of which in turn may be firmware processes executed by CPU 102. In an example, processor 110 may perform one or more operations via OS 114. In an example, information handling system 100 and CPU 102 may each include additional components without varying from the scope of this disclosure. For example, CPU 102 may be a multicore CPU, such that the CPU may include more processor cores than just processor core 110, and more memory controllers. In this example, each processor core may have one or more DIMMs assigned to the processor core. However, for brevity and clarity the description of FIG. 1 will be described with respect to processor core 110 and PCIe devices associated with PCIe root ports 104 and 106.

Processor core 110 can operate to provide data and control interfaces to one or more PCIe devices, such as DIMMs in accordance with a particular memory architecture. For example, processor core 110 and the off-package DIMMs may operate in accordance with a Double-Data Rate (DDR) standard, such as a JEDEC DDR4 or DDR5 standard. Memory 116 may be any suitable type of memory including, but not limited to, a system management random access memory (SMRAM) located internally on the processor package itself. In an example, SMRAM may include dedicated code, such as SMI handling code, SMM RAS error handling code, and data defined a build time. In this example, the SMI handling code may enable CPU 102 to appropriately respond to each individual SMI source. Memory 116 may also store a look-up table 130.

Figure 2:
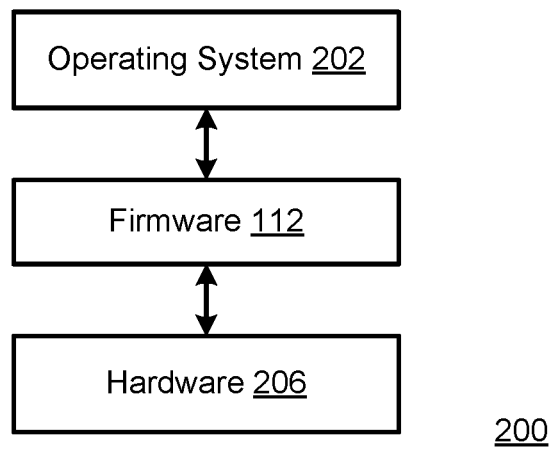
FIGS. 2 and 3 are block diagram of examples of aspects of an unified extensible firmware interface (UEFI) environment according to a specific embodiment of the present disclosure.

Referring now to FIG. 2, examples of aspects of an EFI environment created by BIOS/EFI firmware 140 of the information handling system are described. For example, BIOS/EFI firmware 140 includes firmware compatible with the EFI specification. The EFI specification describes an interface between OS 202 and BIOS/EFI firmware 140. Particularly, the EFI specification defines the interface that BIOS/EFI firmware 140 implements and the interface that OS 202 may use in booting. According to an implementation of EFI, both EFI and legacy BIOS support modules may be present in BIOS/EFI firmware 140. This allows the information handling system to support both firmware interfaces. Addition details regarding the architecture and operation of the EFI are provided below.

Figure 3:
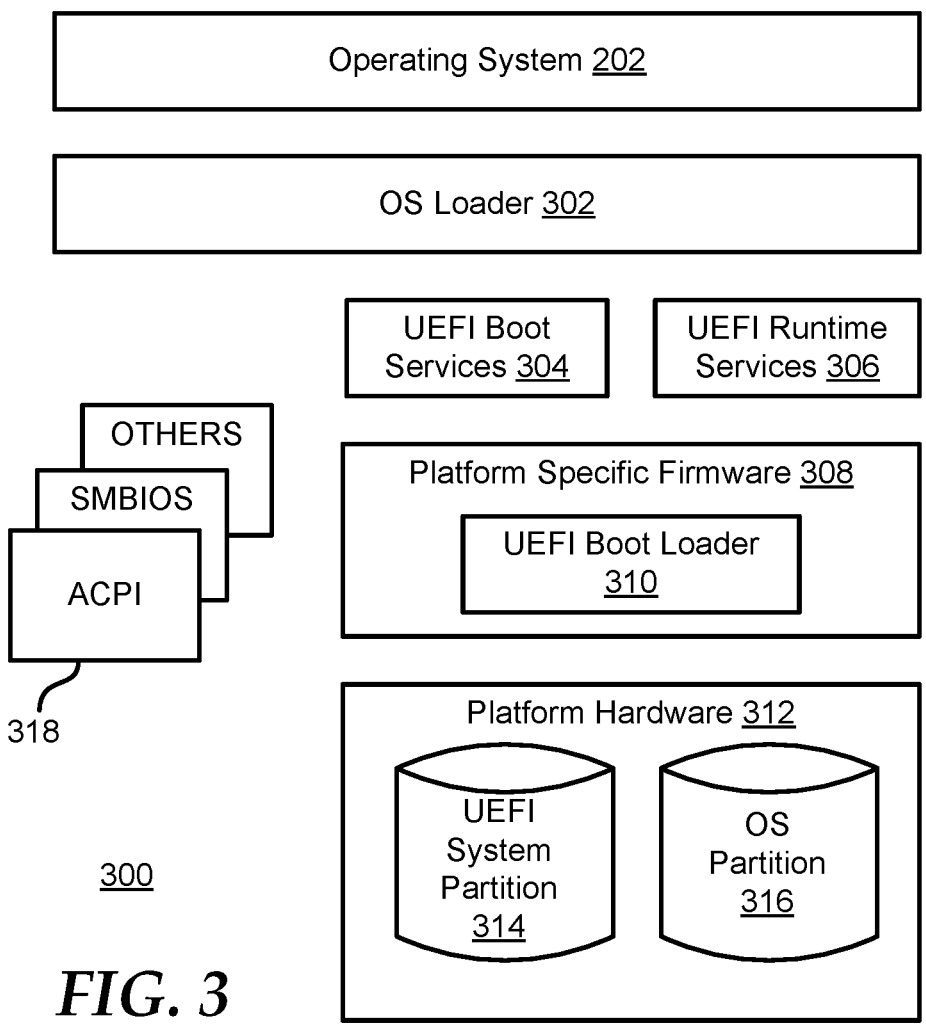

FIG. 3 shows a block diagram of a software architecture 300 that illustrates aspects of UEFI 140 of FIG. 1 and OS 202 of FIG. 2. Specifically, software architecture 300 includes platform hardware 312 and OS 202. Platform specific firmware 308 may retrieve OS program code from UEFI system partition 314 using OS loader 302, also known as a boot loader or OS boot loader. OS loader 302 may retrieve OS program code from other locations, including from attached peripherals or from firmware 140, itself. An OS partition 316 may also be present. Once started, OS loader 302 continues to boot OS 202. OS loader 302 may use UEFI boot services 304 to support other specifications 318. Examples of other supported specifications 318 include advanced configuration and power management interface (ACPI), system management BIOS (SMBIOS), and the like. UEFI boot services 304 may provide interfaces for devices and system functionality that can be used during boot time. UEFI runtime services 306 may be available to OS loader 302 during the boot phase and to OS 202 when running. For example, runtime services 306 may be present to ensure appropriate abstraction of base platform hardware resources that may be needed by OS 202 during normal operation.

UEFI allows extension of platform firmware by loading UEFI drivers and UEFI application images which, when loaded, have access to UEFI runtime and boot services 304. Various program modules provide the boot and runtime services. These program modules may be loaded by boot loader 310 at system boot time. EFI boot loader 310 is a component in the UEFI firmware that determines which program modules should be explicitly loaded and when. Once the UEFI firmware is initialized, it passes control to boot loader 310. Boot loader 310 may be then responsible for determining which program modules to load and in which order.

UEFI images can include UEFI drivers, applications, and boot loaders, and are a class of files defined by UEFI that contain executable code. UEFI boot loader 310 and a boot manager in particular, is a firmware policy engine that is in charge of loading the operating system loader and all necessary drivers. UEFI applications can be loaded by the boot manager or by other UEFI applications to accomplish platform specific tasks within the boot services environment. A UEFI driver is a module of code typically inserted into firmware via protocols interfaces. UEFI drivers can be loaded by the boot manager, firmware conforming to the UEFI specification, or by other UEFI applications. Each UEFI image includes one or more UEFI protocols. A UEFI protocol, also referred to as a protocol interface, is much like a class in object-oriented programming, providing an interface structure containing data definitions, and a set of functions, such as functions to access a device. Each UEFI protocol includes a globally unique identifier (GUID), which is a 128-bit value used to differentiate services and structures in the boot services environment.

The UEFI boot flow can be divided into a sequence of phases, including a pre-EFI initialization (PEI) phase, followed by a driver execution environment (DXE) phase, a boot device selection (BDS) phase, and a run time (RT) phase. The UEFI boot sequence can include additional phases, and one or more phases can be subdivided into two or more sub-phases. For clarity and brevity, details of these phases will not be described except to describe aspects of the present disclosure. The DXE phase is where most of the system initialization is performed. Pre-EFI Initialization (PEI), the phase prior to DXE, is responsible for initializing permanent memory in the platform so that the DXE phase can be loaded and executed. There are several components in the DXE phase, including a DXE foundation, DXE dispatcher, and a set of DXE drivers.

Referring back to FIG. 1, during runtime of information handling system 100 one or more components, such as processor core 110, may monitor for errors in PCIe devices in communication with PCIe root ports 104 and 106. In certain examples, these errors may be PCIe correctable errors, PCIe uncorrectable non-fatal errors, PCIe uncorrectable fatal errors, or the like. If a detected error is a PCIe error, processor core 110 may provide a SMI to SMI handler 120 of BIOS 112 firmware. In response to the SMI, SMI handler 120 may cause CPU 102 to enter a SMM. While in the SMM, CPU 102 may execute SWIM RAS error handler 122 to collect and log information associated with the PCIe error. For example, BIOS 112 may retrieve the available data or information for a PCIe device that had the PCIe error.

In previous information handling systems, the BIOS would collect a location for the PCIe device associated with the PCIe error in a PCIe slot. In the previous information handling systems, the location information would vary based on the type of device experiencing the error. For example, the BIOS would collect a physical slot number in a bitfield for PCIe adaptors. For other PCIe devices, such as embedded devices, slimline (SL) devices, or the like, users of the previous information handling systems would be provided with a PCIe for the affected device. For example, if a PCIe error, such as a PCI1360 fatal error, occurred for an RAID controller in slot 1 of a previous information handling system, the BIOS would provide the user with an exemplary message stating "A fatal error was detected on slot 1". In another example, if a PCIe error, such as a PCI1360 fatal error, occurred for an integrated NIC of a previous information handling system, the BIOS would provide the user with an exemplary message stating "A fatal error was detected on Bus 0x21, Device 0x0, Function 0".

Information handling system 100 may be improved by BIOS 112 creating, and storing in SMM memory 116, a lookup table 140 linking or correlating a friendly full device description for each device to a respective user friendly name for the same device. Based on the lookup table, BIOS 112 may provide the user friendly name to the user, such that device may be easily identified. Using the two examples above, if an uncorrectable fatal error PCI1360 occurred for an RAID controller in slot 1, SMM RAS error handler 122 of BIOS 112 may provide the user with an exemplary message stating "A fatal PCIe error was detected on the RAID controller in slot 1 (Segment 0x00, Bus 0x21, Device 0x0, Function 0)". If an uncorrectable fatal error PCI1360 occurred for an integrated MC, SMM RAS error handler 122 of BIOS 112 may provide the user with an exemplary message stating "A fatal error was detected on the Integrated NIC 1 Port 2 Partition 3 (Segment 0x00, Bus 0x21, Device 0x0, Function 0)". In certain examples, the components within information handling system 100 may perform any suitable operations to provide or report PCIe device error information that may be easily understood by a user, as will be described herein.

During the PEI phase of the boot process, BIOS 112 may collect information associated with all PCI devices, such as PCIe devices in communication with PCIe root ports 104 and 106, in information handling system 100. In an example, the collection of the information for the devices may be performed during a PCIe enumeration process for information handling system 100. In this example, BIOS 112 may execute the enumeration process during the DXE phase of the boot process. In certain examples, the PCIe enumeration process may include determining memory requirements and configuring the PCIe devices.

After PCIe enumeration process is complete, BIOS 112 may generate look-up table 140. In an example, look-up table 140 may include the class of the PCIe devices, PCI addresses (Segment/Bus/Device/Function) for the devices, friendly full device description, friendly device names, or the like. In certain examples, the friendly name may be any suitable alphanumeric string to enable a user to quickly identify the device. In an example, BMC RAS handler may retrieve the friendly name from lookup table 140 by matching the PCI address (Segment/Bus/Device/Function) of the PCIe device reporting the error in the lookup table. An exemplary look-up table 140 showing a device friendly full device description and friendly name is provide below as Table 1:

TABLE 1

| Friendly Full Device Description | Friendly Name |
|---|---|
| DIMM.Socket.A1 | DIMM A1 |
| RAID.Slot.1 | RAID Controller in Slot 1 |
| RAID.Integrated.1 | Integrated RAID Controller 1 |
| NIC.Slot.3-2-1 | NIC in Slot 3, Port 2, Partition 1 |
| Disk.SATAEmbedded.A | Disk on Embedded SATA Port A |

As illustrated in Table 1 above, the friendly name for a device may be provided to a user to provide more information associated with the device. For example, a user may eventually identify the PCIe device in row 6 of Table 1 based on the friendly full device description, Disk. SATAEmbed-ded.A. However, the friendly name, Disk on Embedded SATA Port A, for the PCIe device provides a clearer description to enable the user to quickly identify both the device type and location for the corresponding PCIe device.

Figure 4:
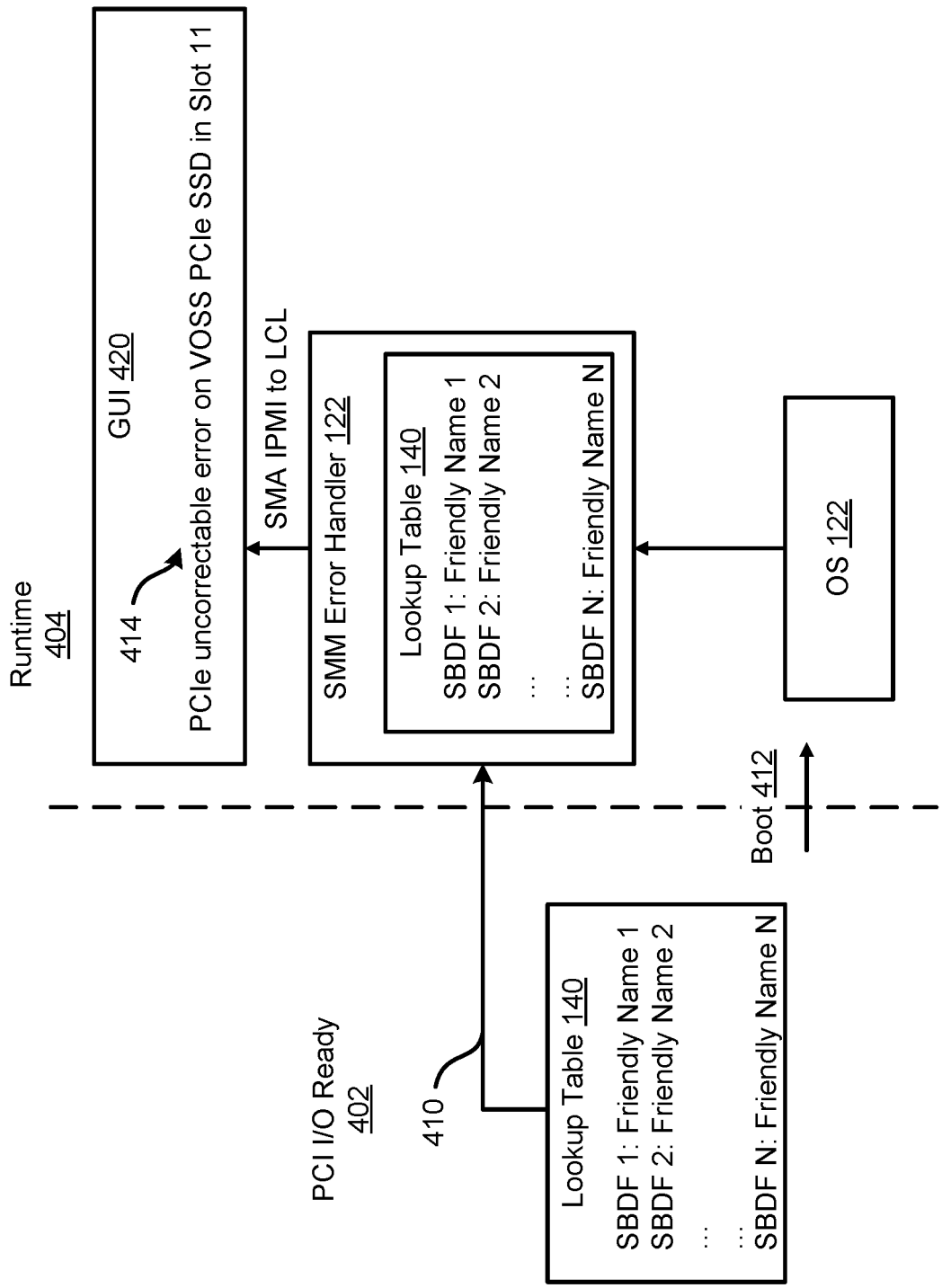
FIG. 4 illustrates a block diagram of portions an information handling system in a boot mode and a runtime mode according to an embodiment of the present disclosure.

Referring to FIG. 4, information handling system 100 may be in a PCI I/O ready phase 402 of the DXE phase, and a runtime 404. Operations of information handling system 100 will be described with respect to FIGS. 1 and 4.

During the PCI I/O ready phase 402 of the DXE phase, BIOS 112 may provide look-up table 140 to SMM error handler 122 at operation 410. In an example, look-up table 140 may be provided in any suitable manner. For example, BIOS 112 may store look-up table 140 in SMM memory 116 and provide a pointer for the memory location to the SMM RAS driver of SMM RAS error handler 122. After look-up table 140 is provided to the SMM RAS driver and the boot operations are completed, BIOS 112 may pass the operation of information handling system 100 to runtime operations by booting information handling system 100 at operation 412.

During runtime 404 of information handling system 100, one or more components, such as processor core 110 executing OS 122, may monitor for errors in PCIe devices in communication with PCIe root ports 104 and 106. In certain examples, these errors may be PCIe correctable errors, PCIe uncorrectable non-fatal errors, PCIe uncorrectable fatal errors, or the like. If a detected error is a PCIe error, processor core 110 may provide a SMI to SMI handler 120 of BIOS 112 firmware. In response to the SMI, SMI handler 120 may cause CPU 102 to enter a SMM. While in the SMM, CPU 102 may execute SMM RAS error handler 122 to collect and log information associated with the PCIe error. For example, BIOS 112 may retrieve the available data or information for a PCIe device that had the PCIe error.

In an example, the data or information for the PCIe device may include the PCIe address and friendly full device description associated with the PCIe device. Based on the collected or retrieved information, SMM RAS error handler 122 may correlate this information with a friendly device name the PCIe device. In an example, SMM RAS error handler 122 may perform the correlation between the friendly full device description and the friendly device name based on look-up table 140. In response to determining or retrieving the friendly device name, SMM RAS error handler 120 may provide error information and the friendly device name to a user of information handling system 100. In an example, SMM RAS error handler 122 may provide the error information and the friendly device name on a graphical user interface (GUI) 414 of a display device, such as display 634 of FIG. 6. An exemplary error message 414 may be "PCIe uncorrectable error on VOSS PCIe SSD in Slot 11". In certain examples, other exemplary error messages 414 may include "Critical memory event detected on DIMM A1" or "A fatal PCIe error was detected on the PCIe SSD in Slot 2 in Bay 1 (Segment Bus 0x21, Device 0x0, Function 0)".

Figure 5:
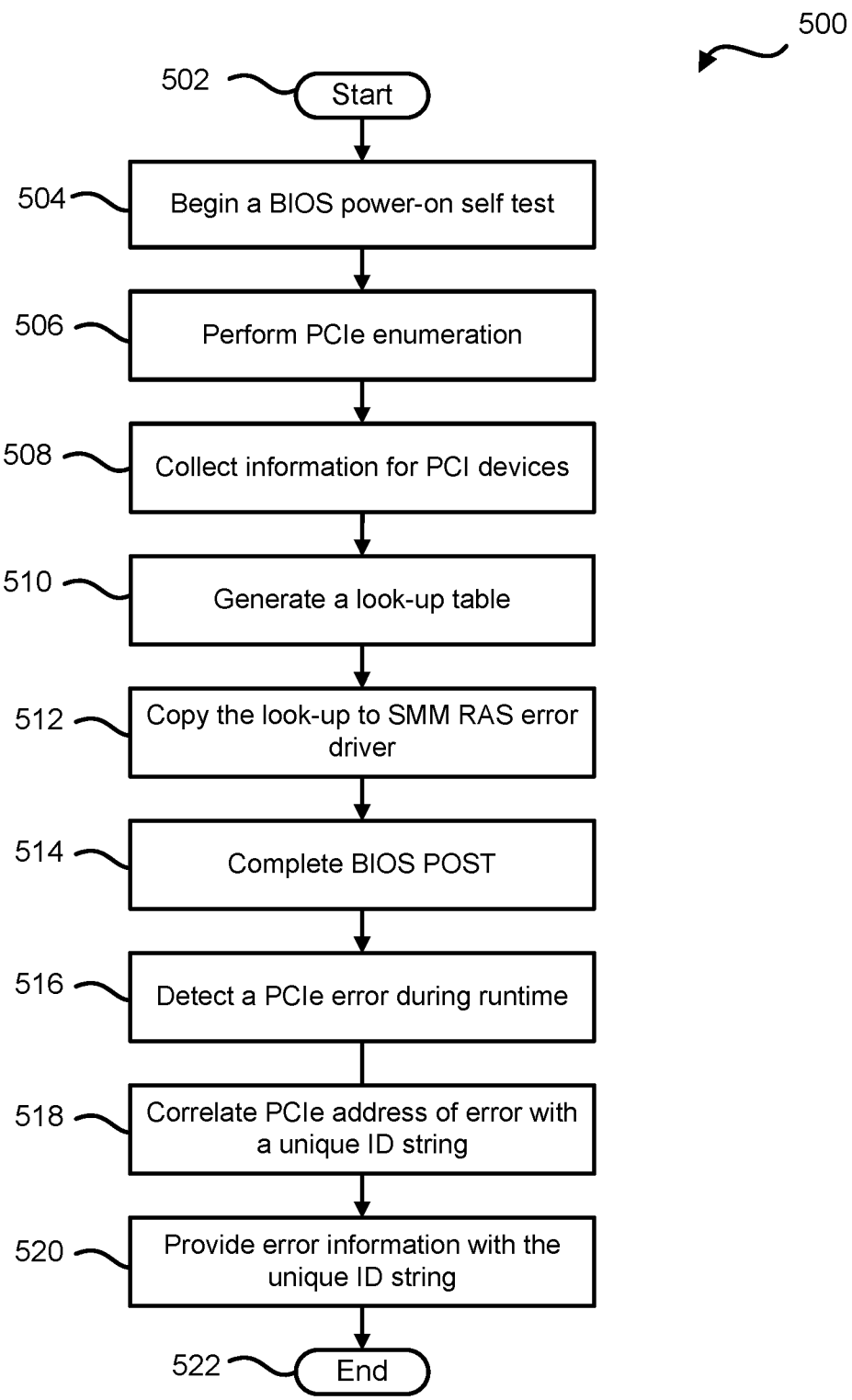
FIG. 5 illustrates a method for reporting PCIe device error information in an information handling system according to an embodiment of the present disclosure.

FIG. 5 illustrates a method 500 for reporting PCIe device error information according to an embodiment of the present disclosure, starting at block 502. In an example, the method 500 may be performed by any suitable component including, but not limited to, BIOS 112 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 504, a BIOS power-on self test (POST) is begun. At block 506, a PCIe enumeration process is performed for the PCIe devices in the information handling system. In certain examples, the PCIe enumeration process may include determining memory requirements and configuring the PCIe devices. At block 508, information for all PCI devices in an information handling system is collected. In an example, the information for the PCI devices is collected during an early stage of the BIOS POST, such as during the PEI phase of boot process.

After PCIe enumeration process is complete, a look-up table is generated at block 510. In an example, a BIOS of the information handling system may generate the look-up table. In certain examples, the look-up table may include the class of the PCIe devices, PCI addresses (Segment/Bus/Device/Function) for the devices, friendly names or unique identification strings of devices, or the like. At block 512, the look-up table is copied to a SMM RAS driver. In an example, the look-up table may be copied during the DXE phase of the boot process, and may be copied from a DXE RAS driver to SMM RAS driver. In certain examples, the SWIM RAS driver may be utilized by a BIOS based on a SMI received during runtime operations of the information handling system. In an example, the DXE RAS driver may create the look-up table may be created during POST, and utilize a memory that may be de-allocated or released for other usage at the end of POST. In this example, the data of the look-up table may be coped to a persistent SWIM memory (SMRAM) for use in OS runtime so that the look-up table data will not be lost.

At block 514, the BIOS POST is completed, and runtime operations of the information handling system as executed. At block 516, a PCIe error is detected during the runtime. In an example, the PCIe error may be PCIe correctable errors, PCIe uncorrectable non-fatal errors, or PCIe uncorrectable fatal errors. At block 518, a PCIe address associated with the PCIe error is correlated with a friendly device name or unique identification string for the PCIe device at the PCIe address. In an example, the correlation between the PCIe address for the error with the unique device identification string may be performed by the SMM RAS error handler utilizing the look-up table. At block 520, the PCIe error information is provide to a user of the information handling system, and the flow ends at block 522. In an example, the PCIe error information may include a description of the error, the address of the error, and the friendly name or unique device identification string for the PCIe device, or the like. In certain examples, the PCIe error information may be provided via a GUI on a display device associated with the information handling system.

Figure 6:
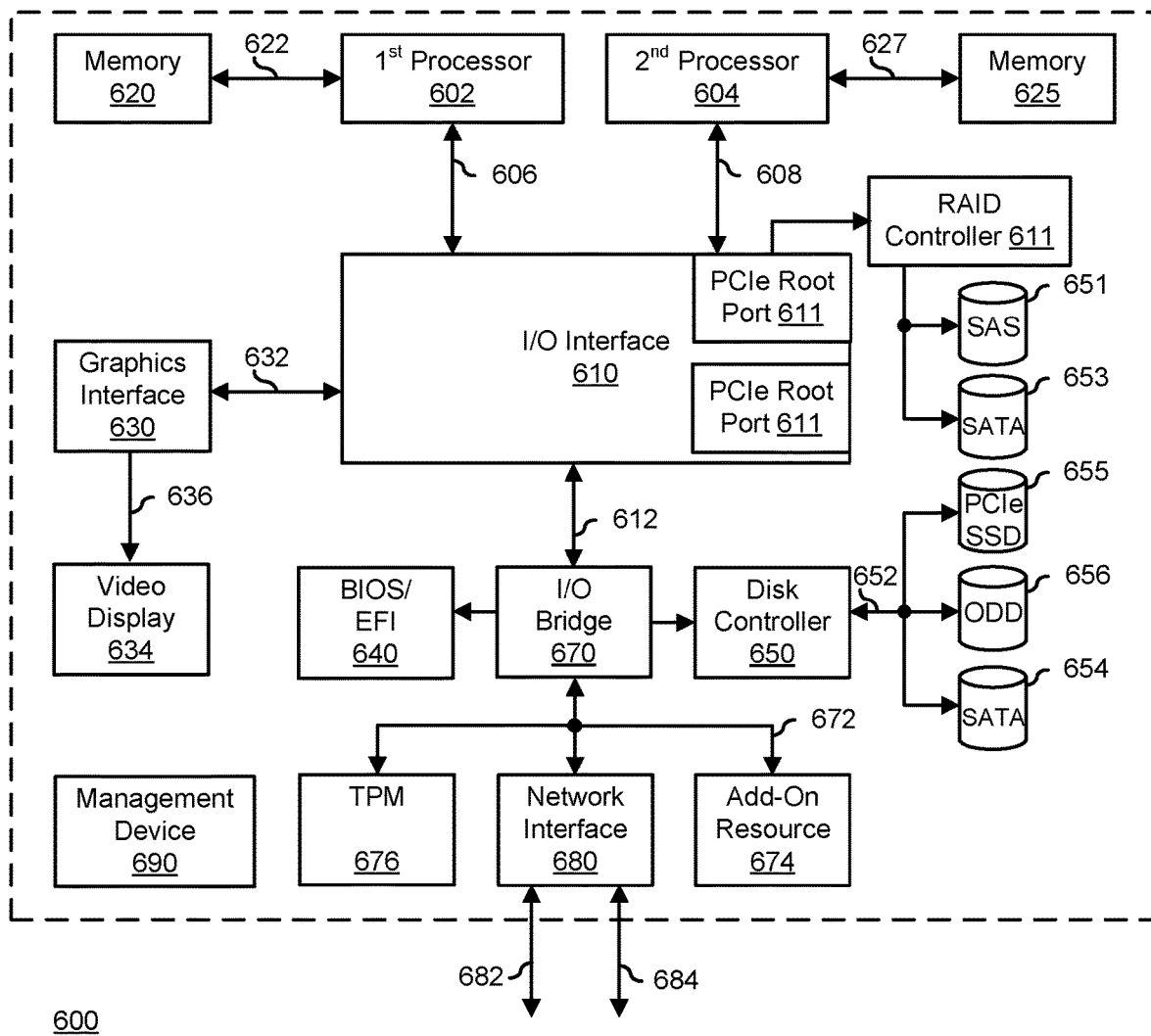
FIG. 6 is a block diagram of a general information handling system according to an embodiment of the present disclosure.

FIG. 6 shows a generalized embodiment of an information handling system 600 according to an embodiment of the present disclosure. Information handling system 600 can include devices or modules that embody one or more of the devices or modules described below and operates to perform one or more of the methods described below. Information handling system 600 includes a processors 602 and 604, an input/output (I/O) interface 610, one or more PCIe root ports, memories 620 and 625, a graphics interface 630, a basic input and output system/universal extensible firmware interface (BIOS/UEFI) module 640, a disk controller 650, a serial-attached small computer system interface (SCSI) solid state (SAS) drive 651, a serial Advanced Technology Attachment (SATA) drive 653, a SATA drive 654, a PCIe solid state drive (SSD) 655, an optical disk drive (ODD) 656, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, SAS 651, SATA 653, SATA 654, PCIe SSD 655, ODD 656, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632 and provides a video display output 636 to a video display 634. In a particular embodiment, information handling system 600 includes separate memories that are dedicated to each of processors 602 and 604 via separate memory interfaces. An example of memories 620 and 625 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 and PCIe root ports 611 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

PCIe root port 611 may connect with RAID controller 613, which in turn connects the PCIe root port to SATA 653 and to PCIe SSD 655. Disk controller 650 includes a disk interface 652 that connects the disk controller to SAS 651, to SATA 654, to ODD 656, and to disk emulator 650. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof.

I/O bridge 670 includes a peripheral interface 672 that connects the I/O bridge to add-on resource 674, to TPM 676, and to network interface 680. Peripheral interface 672 can be the same type of interface as I/O channel 612 or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600.

Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a plurality of peripheral component interconnect express (PCIe) devices; and
    a basic input/output system (BIOS) to:
        receive a system management interrupt (SMI) in response to a detection of an error on a first PCIe device of the PCIe devices;
        collect data associated with the first PCIe device, wherein the data includes a friendly full device description for the first PCIe device;
        based on the friendly full device description, determine a friendly name for the first PCIe device, wherein the friendly name includes a segment, bus, device, and function identifier for the first PCIe device; and
        provide an error message on a graphical user interface (GUI) of a display device of the information handling system, wherein the error message includes a type of the error detected and the friendly name for the first PCIe device.

2. The information handling system of claim 1, wherein the determination of the friendly name, the BIOS further to correlate the friendly full device description for the first PCIe device with the friendly name for the first PCIe device in a look-up table.

3. The information handling system of claim 2, further comprising a memory to communicate with the BIOS, the memory to store the look-up table.

4. The information handling system of claim 3, during boot operations of the information handling system, the BIOS further to:
    perform a PCIe enumeration process to collect information for all of the PCIe devices; and
    generate the look-up table based on the information for all of the PCIe devices.

5. The information handling system of claim 4, wherein the look-up table includes a different entry for each of the PCIe devices in the information handling system.

6. The information handling system of claim 4, wherein the BIOS further to provide the look-up table to a system management mode (SMM) reliability, availability, and serviceability (RAS) driver.

7. The information handling system of claim 6, wherein when the BIOS provides the look-up table, the BIOS further to provide the SMM RAS driver with a pointer identifying a location in the memory associated with the look-up table.

8. The information handling system of claim 1, wherein the friendly name is an alphanumeric string.

9. A method, comprising:
detecting an error on a peripheral component interconnect express (PCIe) device;
in response to the detection of the error, providing a system management interrupt (SMI) to a basic input/output system (BIOS) of an information handling system;
collecting, by the BIOS, data associated with the PCIe device, wherein the data includes a friendly full device description for the PCIe device;
determining, based on the friendly full device description and by the BIOS, a friendly name for the PCIe device, wherein the friendly name includes a segment, bus, device, and function identifier for the PCIe device; and
providing an error message on a graphical user interface (GUI) of a display device of the information handling system, wherein the error message includes a type of the error detected and the friendly name for the PCIe device.

10. The method of claim 9, further comprising correlating the friendly full device description for the PCIe device with the friendly name for the PCIe device in a look-up table.

11. The method of claim 10, wherein during boot operations of the information handling system, the method further comprises:
performing a PCIe enumeration process to collect information for all of the PCIe devices; and
generating the look-up table based on the information for all of the PCIe devices.

12. The method of claim 11, wherein the look-up table includes a different entry for each of the PCIe devices.

13. The method of claim 11, further comprising providing the look-up table to a system management mode (SMM) reliability, availability, and serviceability (RAS) driver.

14. The method of claim 13, wherein the providing of the look-up table, the method further comprising providing the SMM RAS driver with a pointer identifying a location in a memory associated with the look-up table.

15. The method of claim 9, wherein the friendly name is an alphanumeric string.

16. An information handling system, comprising:
a plurality of peripheral component interconnect express (PCIe) devices;
a memory to store a look-up table associated with the PCIe devices; and
a basic input/output system (BIOS) to communicate with the memory, wherein during boot operations of the information handling system, the BIOS:
performs a PCIe enumeration process to collect information for all of the PCIe devices; and
generates the look-up table based on the information for all of the PCIe devices, wherein the look-up table includes a friendly full device description for a first PCIe device of the PCIe devices and a friendly name for the first PCIe device, wherein the friendly name is an alphanumeric string;
wherein during a runtime of the information handling system, the BIOS to:
receive a plurality of system management interrupts (SMIs), wherein at least one of the SMIs is in response to a detection of an error on the first PCIe device of the PCIe devices;
collect data associated with the first PCIe device, wherein the data includes the friendly full device description for the first PCIe device;
based on the friendly full device description and the look-up table, determine a friendly name for the first PCIe device, wherein the friendly name includes a segment, bus, device, and function identifier for the first PCIe device; and
provide an error message on a graphical user interface (GUI) of a display device of the information handling system, wherein the error message includes a type of the error detected and the friendly name for the first PCIe device.

17. The information handling system of claim 16, wherein during the runtime of the information handling system, the BIOS further to correlate the friendly full device description for the first PCIe device with the friendly name for the first PCIe device in a look-up table.

18. The information handling system of claim 16, wherein the look-up table includes a different entry for each of the PCIe devices.

19. The information handling system of claim 16, wherein during the boot operations, the BIOS further to provide the look-up table to a system management mode (SMM) reliability, availability, and serviceability (RAS) driver.

20. The information handling system of claim 19, wherein when the BIOS provides the look-up table, the BIOS further to provide the SMM RAS driver with a pointer identifying a location in the memory associated with the look-up table.

* * * * *